Patented Oct. 17, 1944

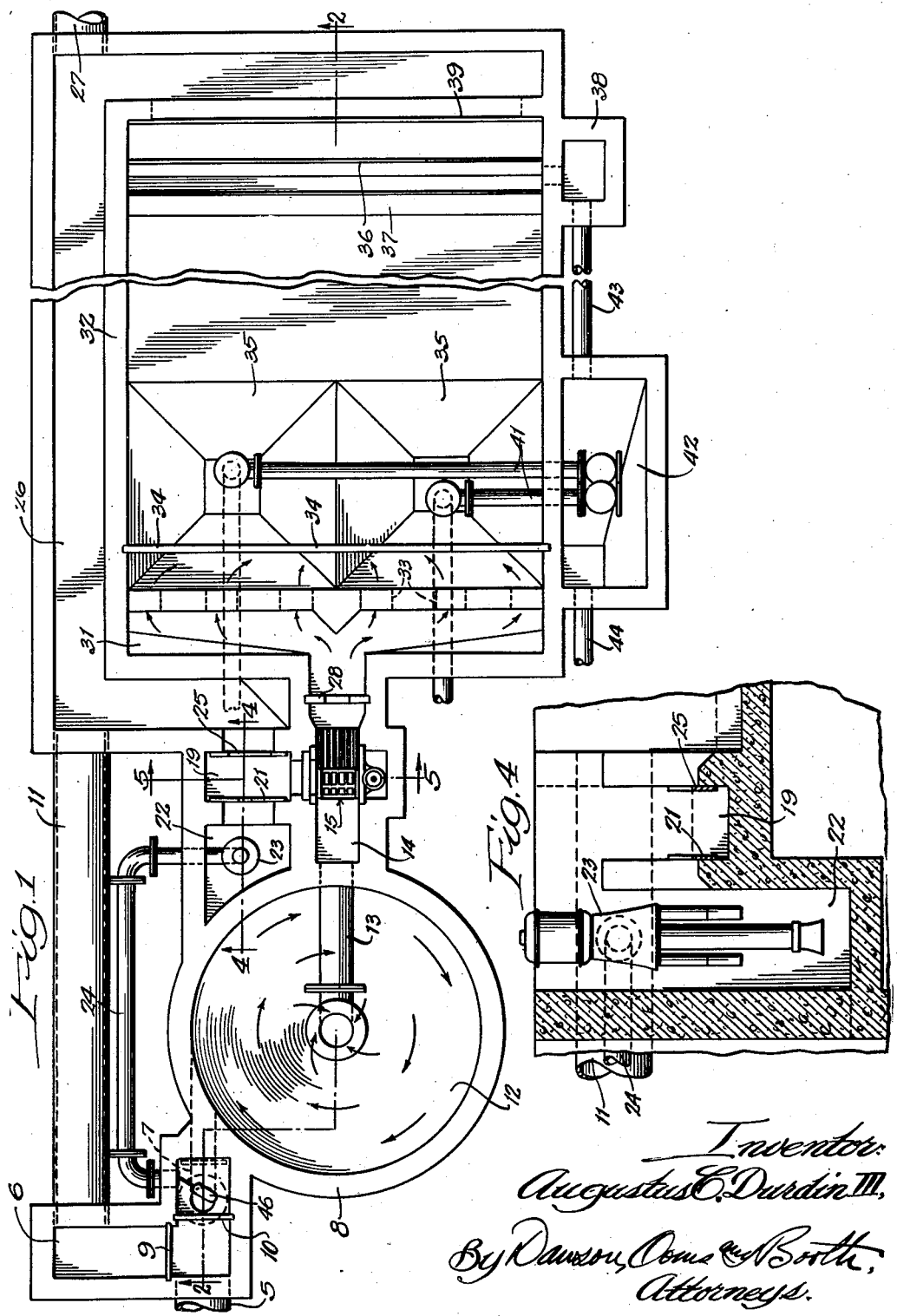

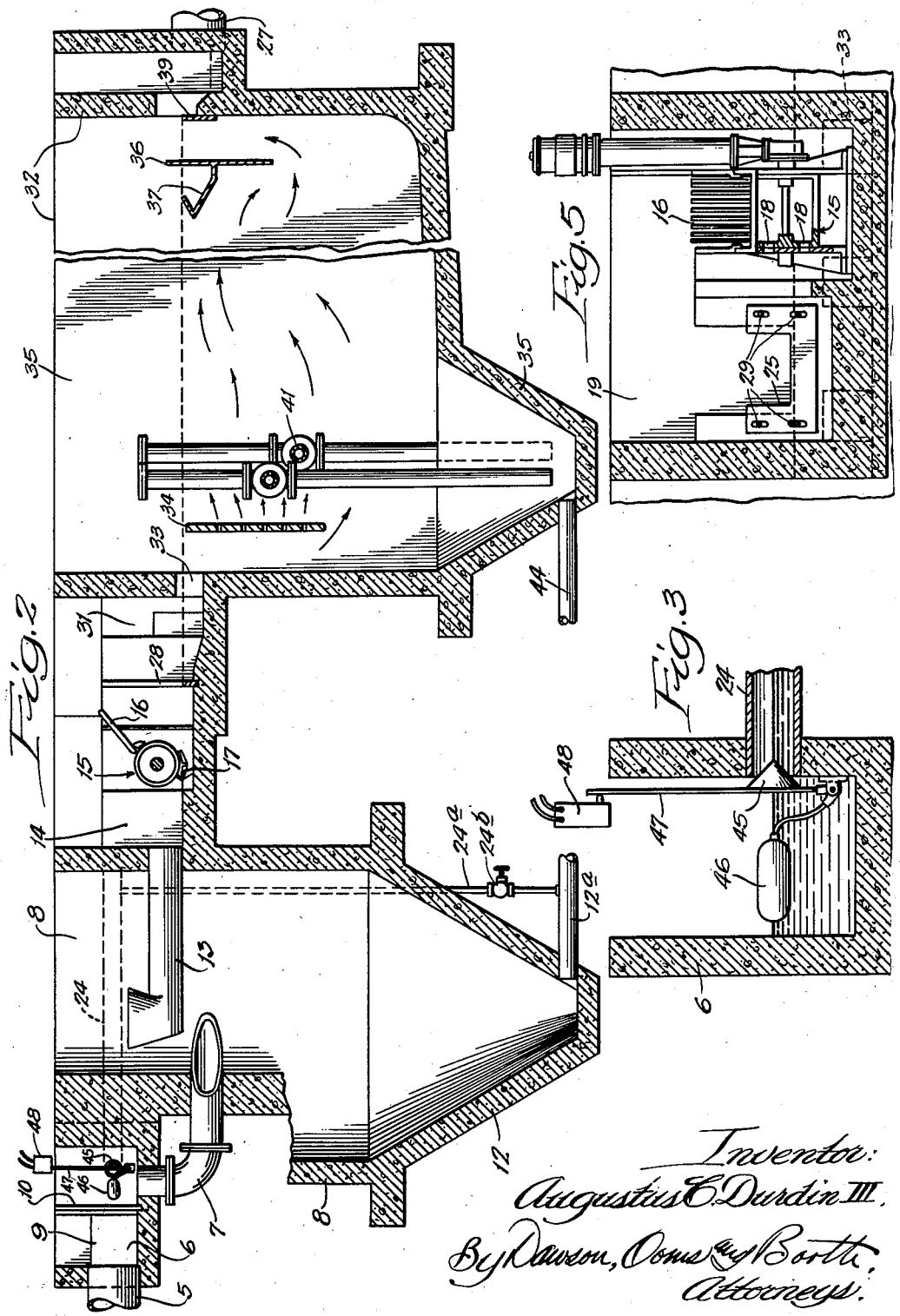

2,360,551

UNITED STATES PATENT OFFICE 2,360,551

SEWAGE TREATMENT METHOD AND APPARATUS

Augustus C. Durdin, III, Skokie, Ill., assignor of twenty-four per cent to Lewis H. Durdin, Franklin, Pa., and fifty-two per cent to Augustus C. Durdin, Jr., Chicago, Ill.

Application February 20, 1942, Serial No. 431,705

19 Claims. (Cl. 210—3)

This invention relates to sewage treatment method and apparatus, and more particularly to the physical treatment of sewage to remove and concentrate all of the settlable solids.

One of the objects of the invention is to provide a sewage treatment method and apparatus in which grit and the like is separated from the sewage in such a manner as to be substantially free of organic solids. According to one feature of the invention, the grit may be washed during and after separation to remove retained particles of organic solids therefrom.

Another object of the invention is to provide a sewage treatment method and apparatus in which grit and the like is separated from the sewage by settling, and in which a portion of strained sewage is re-circulated through the grit separating apparatus to maintain a substantially predetermined velocity of flow therethrough.

Another object of the invention is to provide a sewage treatment method and apparatus in which incoming sewage flow is divided with a substantial portion of the strained liquid being conducted directly to a discharge point and the remainder of the sewage containing a high concentration of settlable solids being treated to remove the solids.

Still another object of the invention is to provide a sewage treating method and apparatus in which the settlable solids are concentrated in a portion of the sewage and are comminuted and discharged into a treating apparatus.

Still another object of the invention is to provide a sewage treatment method and apparatus in which the flow is divided into a portion of strained liquid and another portion containing all of the settlable solids, and the division is controlled to obtain the desired proportionate amounts of each. Preferably, the control is effected by weirs, one or all of which may be adjustable.

Another object of the invention is to provide sewage treatment method and apparatus in which all of the settlable solids are concentrated in a portion of the sewage which is clarified and from which the liquids and settlable solids are separably withdrawn for disposal or further treatment.

Another object of the invention is to provide a sewage treatment method and apparatus in which a relatively small size apparatus may be used for the treatment of a given quantity of sewage, due to the fact that a smaller quantity of sewage of higher concentration is supplied to the apparatus for treatment.

The above and other objects, advantages and novel features of the invention will be more readily apparent from the following description when read in connection with the accompanying drawings, in which:

Figure 1 is a plan view of a sewage treatment apparatus embodying the invention

Figure 2 is a longitudinal section on the line 2—2 of Figure 1;

Figure 3 is a diagram illustrating the return flow control mechanism;

Figure 4 is a partial enlarged section on the line 4—4 of Figure 1; and

Figure 5 is a partial section on the line 5—5 of Figure 1.

In the apparatus illustrated, raw sewage to be treated is supplied by an influent pipe 5, discharging into an inlet control box 6. The control box 6 is formed with an outlet pipe 7 discharging tangentially into a circular grit chamber 8, and with a by-pass weir 9 connected to an overflow conduit 11. In normal use of the apparatus, all of the incoming sewage is discharged through the pipe 7, but in the event of extremely high flows, as for example during storms or the like, a portion of the flow may be by-passed directly through the overflow conduit 11 over the control weir 9. A gate 10 may be provided to close the passage to the outlet 7 to shut off the flow of sewage through the apparatus for cleaning or repairs.

The grit chamber 8, as best shown in Figure 2, is formed with vertical circular walls in its upper part and with a hopper-shaped bottom 12. The inlet conduit 7 discharges tangentially into this chamber in the intermediate portion thereof, and liquid may flow therefrom through an outlet conduit 13, having its inlet located centrally adjacent the upper part of the chamber. Due to the tangential circulation in the chamber, grit and like heavy solid particles will settle to the bottom along the outside walls of the chamber, to collect in the hopper 12 and the sewage freed from grit will rise in the chamber and flow out through the outlet conduit 13.

Discharge through the conduit 13 is led into a strainer-comminutor chamber 14, in which there is arranged a strainer unit, indicated generally at 15. This unit comprises a cylindrical screen rotatable on a horizontal axis and mounted in the chamber 14 so that flow of sewage is diametrically therethrough. A screen grate 16 may be mounted above the cylindrical screen to collect solid particles in the event of high flows rising above the top of the screen unit. If desired, the unit may be made a combined strainer and comminutor unit, by providing a cutting blade 17 adjacent the outer surface of the screen, to cooperate with axially extending cutter bars on the exterior of the screen, as is more particularly described and claimed in my co-pending application, Serial No. 423,968, filed December 22, 1941.

The cylindrical screen is formed in one end, as best seen in Figure 5, with axial outlet openings 18, through which a portion of the strained liquid from the interior of the screen may flow. This strained liquid flows into a control box 19 and the remainder of the liquid flowing out through the screen washes from the surface thereof on the downstream side the solids collected on the screen. In this way, the screen is kept clean at all times, and a portion of the liquid from the sewage is withdrawn in the screening unit so that flow from the downstream side contains only a portion of the original liquid, together with all of the strainable solids to provide a highly concentrated body of sewage.

According to one feature of the invention, a portion of the strained liquid entering the control box 19 may be returned to the inlet of the grit chamber to maintain a predetermined rate of flow therethrough. For this purpose, a weir 21 is provided in the control box communicating with a sump 22, from which liquid is pumped by a pumping unit 23 into a pipe 24, which communicates with the inlet control box 6. By regulation of the weir 21, any desired proportion of the strained liquid may be returned to the inlet control box to maintain a substantially predetermined rate of flow through the grit separating chamber, so that a desired velocity may be maintained therein at all times. I have found that for best results, this velocity should be from one to two feet per second, at which velocity the grit will be most effectively separated without permitting settling of any of the lighter solids contained in the sewage. Grit collected in the hopper 12 of the grit chamber may be washed before it is discharged, in order to remove therefrom any organic solids settling from the sewage along with the grit. For this purpose, I have provided a branch pipe 24a, communicating with the pipe 24 and controlled by a valve 24b. The pipe 24 is connected with a discharge pipe 12a leading from the lower portion of the hopper 12 and which may be controlled by any suitable valve mechanism, not shown. When the valve 24b is opened, a portion of the strained liquid from the pipe 24 is diverted into the discharge pipe 12a and backwashes the grit collected in the hopper, so that any lighter solids collected therein will be washed from the grit before it is removed.

If desired, an automatic control may be provided to regulate the amount of return flow to the grit chamber to maintain the rate of flow therethrough within closer limits. One construction of this type for regulating the return flow in accordance with the level in the inlet box 6 is illustrated in Figure 3 as comprising a tapered plug valve 45 moving toward and away from the open end of pipe 24 under the influence of a float 46. As the level in the inlet box rises, the float will close the valve to a greater extent to restrict the return flow through the conduit 24. and as the level falls the valve will open. Thus, the valve tends to maintain a substantially constant head in the inlet box, and accordingly, a constant rate of flow through the grit chamber.

To increase the economy of operation, the return pump 23 may be shut off if desired when the rate of supply of sewage through the pipe 5 is such as to maintain the desired rate of flow in the grit chamber. For this purpose, an arm 47 may be connected to the float, either directly or through the valve 45, as shown, to control an electric switch 48 which is arranged in the control circuit for the pump 23. When the liquid in the inlet box 6 exceeds a predetermined level, the arm 47 will move away from the switch and allow it to open to stop the pump. Below that level, however, the arm engages and closes the switch to maintain the pump in operation.

The grit separation unit, as described above, may advantageously be employed with various types of sewage plants to remove grit and the like from the incoming sewage before it is conducted to the comminutors or other treating apparatus.

Another portion of the strained liquid flowing into the control box 19 is preferably conducted directly to a discharge point and for this purpose a second weir 25 is provided in the control box, communicating with an effluent channel 26, to which the pipe 11 may also be connected. The channel 26 discharges through a conduit 27 to conduct effluent from the plant for further treatment or for disposal. The remaining portion of the sewage, containing all of the settlable solids, which is discharged from the screening unit, flows over a control weir 28 into a primary treatment tank to be described later. Preferably, either or both of the weirs 25 and 28 may be made adjustable to proportion, as desired, the quantity of sewage conducted directly to the effluent conduit over the weir 25 and the quantity entering the primary treating tank over the weir 28. As shown in Figure 4, the weir 25 is adjustably mounted in the control box 19 so that its level can be controlled as desired by means of removable fastenings 29, which support the weir.

The concentrated sewage flowing over the weir 28 enters a feed channel 31 extending across one end of a primary treating tank 32. Sewage from the channel 31 is discharged through a series of openings 33 into the upper part of the tank 32, and the flow is further distributed by means of a perforated panel 34 extending across the tank adjacent the inlet end thereof. Between the channel 34 and the inlet channel 31, the sewage flow is distributed substantially uniformly across the tank and its inlet velocity is substantially reduced adjacent the inlet end of the tank. As the sewage flows through the tank at this greatly reduced velocity, the heavy solids therein settle to the bottom of the tank and are collected in sludge hoppers 35 formed in the tank bottom. As shown, two such hoppers are provided, but it will be apparent that more or less could be utilized, as desired, depending upon the size and character of the installation.

Adjacent the outlet end of the tank, a scum trough is provided formed with a back plate 36 to the forward side of which a channel plate 37 is connected. Grease formations, scum and the like floating on the surface of the liquid will collect in this trough and may be withdrawn from one end thereof to a sludge box 38 at one side of the primary tank. Liquid passing around or under the box plate 36 flows over an outlet weir 39 communicating with the effluent channel 26. By adjustment of the weir 39, the liquid level in the primary treating tank may be controlled.

Sludge collecting in the sludge hoppers 35 may be withdrawn therefrom periodically through discharge pipes 41 into a concentrated sludge hopper 42 at one side of the primary tank. Preferably, the scum and the like collected in the scum box 38 may also be conducted to the concentrated sludge hopper through a conduit 43. The concentrated material in the hopper 42 may be withdrawn therefrom through a conduit 44 to digesters or to any other desired point of disposal.

The effluent discharged through the effluent conduit 27, having had all of the settleable solids removed therefrom, is of a relatively low concentration, and may be further treated in any desired manner, or may, if preferred, be discharged directly to a body of water such as a stream or lake. In the event that effluent is to be further treated, as by chlorination, activated sludge process, trickling filters, or chemical precipitation, it will be seen that the load on the treating apparatus has been substantially lessened by removal of all of the settleable solids, and in many cases, it will be found that this effluent can be discharged directly into an available body of water without undue pollution thereof because so much of the objectionable matter has been removed from it.

Because of the fact that a substantial portion of the liquid has been strained from the incoming sewage before it is conducted into the primary treating chamber, it will be seen that this chamber may be made of a much smaller size than that normally required to handle a given quantity of sewage. The sewage entering the primary treating tank is highly concentrated, and may flow through a relatively small tank at a very low velocity, so that all of the settleable solids will readily separate therefrom. Thus, a much smaller installation than that normally required may be employed by the use of the present invention.

While one embodiment of the invention has been shown and described in detail, it will be understood that this is illustrative only and is not to be taken as a definition of the scope of the invention, reference being had for this purpose to the appended claims.

What is claimed is:

1. The method of treating sewage which comprises directing a flow of the sewage containing liquid and solids in a regulated path to permit settling out of relatively heavy solids while maintaining lighter solids in suspension in the liquid part of the sewage, straining the solids from the liquid, and returning a portion of the liquid to the incoming sewage to maintain a predetermined rate of flow.

2. The method of treating sewage which comprises directing a flow of raw sewage containing liquids and solids in a substantially circular path to permit relatively heavy solids to settle while maintaining the lighter solids in suspension, withdrawing the sewage from the upper central part of the path, straining solids from the withdrawn sewage, returning a portion of the strained sewage to the raw sewage, and regulating the amount of sewage returned to maintain a predetermined rate of flow in said path.

3. The method of treating sewage which comprises directing a flow of the sewage containing liquids and solids in a rotational path to permit settling out of relatively heavy solids while maintaining lighter solids in suspension in the liquid part of the sewage, straining the solids from the liquid, returning a portion of the liquid to the incoming sewage to maintain a predetermined rate of rotational flow, conducting another portion of the liquid and the strained solids to a settling chamber, allowing the solids to settle from the liquid, and removing the liquid.

4. The method of treating sewage which comprises directing a flow of the sewage containing liquids and solids in a rotational path to permit settling out of relatively heavy solids while maintaining lighter solids in suspension in the liquid part of the sewage, straining the solids from the liquid, returning a portion of the liquid to the incoming sewage to maintain a predetermined rate of rotational flow, conducting another part of the liquid directly to a sewage discharge point, conducting a third part of the liquid and the strained solids to a settling chamber, allowing the solids to settle from the liquid, and conducting the liquid to the discharge point.

5. The method of treating sewage which comprises straining a portion of the liquid from an incoming stream of sewage containing liquid and solids and conducting it directly to a discharge point, conducting the remainder of the stream of sewage to a settling chamber, allowing the solids to separate from the liquid in the settling chamber, and conducting the liquid to the discharge point.

6. The method of treating sewage which comprises straining the solids from the liquid in an incoming stream of sewage containing liquid and solids, conducting a part of the liquid directly to a discharge point, utilizing another part of the liquid to wash the solids from the straining means, conducting the last named part of the liquid and the solids to a settling chamber, allowing the solids to separate from the liquid, and conducting the liquid to the discharge point.

7. The method of treating sewage which comprises straining a portion of the liquid from an incoming stream of sewage containing liquid and solids and conducting it directly to a discharge point, conducting the remainder of the stream of sewage to a settling chamber, allowing the solids to separate from the liquid in the settling chamber, separating scum and like floating solids from the surface of the liquid in the settling chamber, conducting the liquid to the discharge point, and withdrawing the settled solids and collected scum.

8. Sewage treating apparatus comprising a circular chamber arranged on a substantially vertical axis, an inlet pipe for sewage containing liquid and solids connected to discharge tangentially of the chamber into the chamber, an outlet pipe communicating with the chamber at the upper central portion thereof, means to separate a portion of the liquid from the sewage flowing out the outlet pipe, and means to return a portion of the separated liquid to the inlet pipe.

9. Sewage treating apparatus comprising a circular chamber arranged on a substantially vertical axis, an inlet pipe for sewage containing liquid and solids connected to discharge tangentially of the chamber into the chamber, an outlet pipe communicating with the chamber at the upper central portion thereof, means to separate a portion of the liquid from the sewage flowing out the outlet pipe, means to return a portion of the separated liquid to the inlet pipe, and means operable at will to conduct a portion of the separated liquid to the lower portion of the chamber to wash collected solids therein.

10. Sewage treating apparatus comprising a circular chamber arranged on a substantially vertical axis, an inlet pipe for sewage containing liquid and solids connected to discharge tangentially of the chamber into the chamber, an outlet pipe communicating with the chamber at the upper central portion thereof, means to separate a portion of the liquid from the sewage flowing out the outlet pipe, means to return a portion of the separated liquid to the inlet pipe, a discharge conduit connected to the lower part of the chamber to withdraw collected solids therefrom, and means operable at will to conduct a portion of the separated liquid to the conduit.

11. Sewage treating apparatus comprising a circular chamber arranged on a substantially vertical axis, an inlet pipe for sewage containing liquid and solids connected to discharge tangentially of the chamber into the chamber, an outlet pipe communicating with the chamber at the upper central portion thereof, means to separate a portion of the liquid from the sewage flowing out the outlet pipe, means to return a portion of the separated liquid to the inlet pipe, a settling chamber to which another portion of the liquid carrying solids in suspension is conducted, and means for separately removing settled solids and liquid from the settling chamber.

12. Sewage treating apparatus comprising means forming a grit chamber having an inlet and an outlet to separate relatively heavy solids from incoming sewage containing liquid and solids, screening means in the outlet from the grit chamber to strain a portion of the liquid from the sewage, a control box receiving the strained liquid from the screening means, a pair of control weirs in the control box, means for conducting the liquid flowing over one of the weirs to the inlet of the grit chamber, and means to conduct liquid flowing over the other weir to a discharge point.

13. Sewage treating apparatus comprising means forming a grit chamber having an inlet and an outlet to separate relatively heavy solids from incoming sewage containing liquid and solids, screening means in the outlet from the grit chamber to strain a portion of the liquid from the sewage, a treating chamber to receive sewage containing solids from the screening means, and a pair of control weirs regulating respectively the liquid flow and the sewage flow to proportion the flows.

14. Sewage treating apparatus comprising means forming a grit chamber having an inlet and an outlet to separate relatively heavy solids from incoming sewage containing liquid and solids, screening means in the outlet from the grit chamber to strain a portion of the liquid from the sewage, and means to return at least a portion of the strained liquid to the inlet of the grit chamber to maintain a predetermined rate of flow through the chamber.

15. Sewage treating apparatus comprising screening means to strain a portion of the liquid from incoming sewage containing liquid and solids, means to conduct at least a portion of the liquid to a discharge point, means for separating the solids from the liquid in the remaining sewage, means for conducting liquid from the last named means to the discharge point, and means for separately withdrawing solids separated in the last named means.

16. Sewage treating apparatus comprising screening means to strain a portion of the liquid from incoming sewage containing liquid and solids, means to conduct at least a portion of the liquid to a discharge point, a settling chamber receiving the remaining sewage containing solids and in which the solids are separated from the liquid, and means for separately discharging the solids and liquid from the settling chamber.

17. Sewage treating apparatus comprising screening means to strain a portion of the liquid from incoming sewage containing liquid and solids, means to conduct at least a portion of the liquid to a discharge point, a settling chamber receiving the remaining sewage containing solids and in which the solids are separated from the liquid, means for conducting liquid from the settling chamber to the discharge point, a concentrated sludge chamber, means to conduct collected solids from the settling chamber to the concentrated sludge chamber, means adjacent the liquid surface in the settling chamber to collect scum and floating solids and to conduct them to the concentrated sludge chamber, and means for withdrawing collected material from the concentrated sludge chamber.

18. Sewage treating apparatus comprising a rotary cylindrical screen through which sewage containing liquid and solids flows substantially diametrically, means forming an outlet opening at one end of the screen through which a portion of the liquid may flow, the remainder of the liquid flowing out through the cylindrical wall of the screen to wash collected solids therefrom, and means controlling one of the liquid flows to proportion the two flows.

19. Sewage treating apparatus comprising a rotary cylindrical screen through which sewage containing liquid and solids flows substantially diametrically, means on the exterior of the screen to comminute solids collected thereon to a predetermined maximum size, means forming an outlet opening at one end of the screen through which a portion of the liquid may flow, the remainder of the liquid flowing out through the cylindrical wall of the screen to wash collected solids therefrom, and means controlling one of the liquid flows to proportion the two flows.

AUGUSTUS C. DURDIN, III.